June 2, 1942.                     W. HETER                     2,284,656
                           DYNAMO-ELECTRIC MACHINE
                        Filed July 19, 1940        2 Sheets-Sheet 1

Inventor:
Wylie Heter,
by Harry E. Dunham
His Attorney.

June 2, 1942.  W. HETER  2,284,656

DYNAMO-ELECTRIC MACHINE

Filed July 19, 1940  2 Sheets-Sheet 2

Inventor:
Wylie Heter,
by Harry E. Dunham
His Attorney.

Patented June 2, 1942

2,284,656

UNITED STATES PATENT OFFICE 2,284,656

DYNAMOELECTRIC MACHINE

Wylie Heter, Scotia, N. Y., assignor to General Electric Company, a corporation of New York Application July 19, 1940, Serial No. 346,378

8 Claims. (Cl. 171—252)

My invention relates to improvements in dynamo-electric machines.

An object of my invention is to provide an improved ventilating system for dynamo-electric machines.

Another object of my invention is to provide an improved cooling medium impeller particularly adapted for use in dynamo-electric machine ventilating systems.

Further objects and advantages of my invention will become apparent and my invention will be better understood from the following description referring to the accompanying drawings, and the features of novelty which characterize my invention will be pointed out with particularity in the claims annexed to and forming part of this specification.

Figure 1:
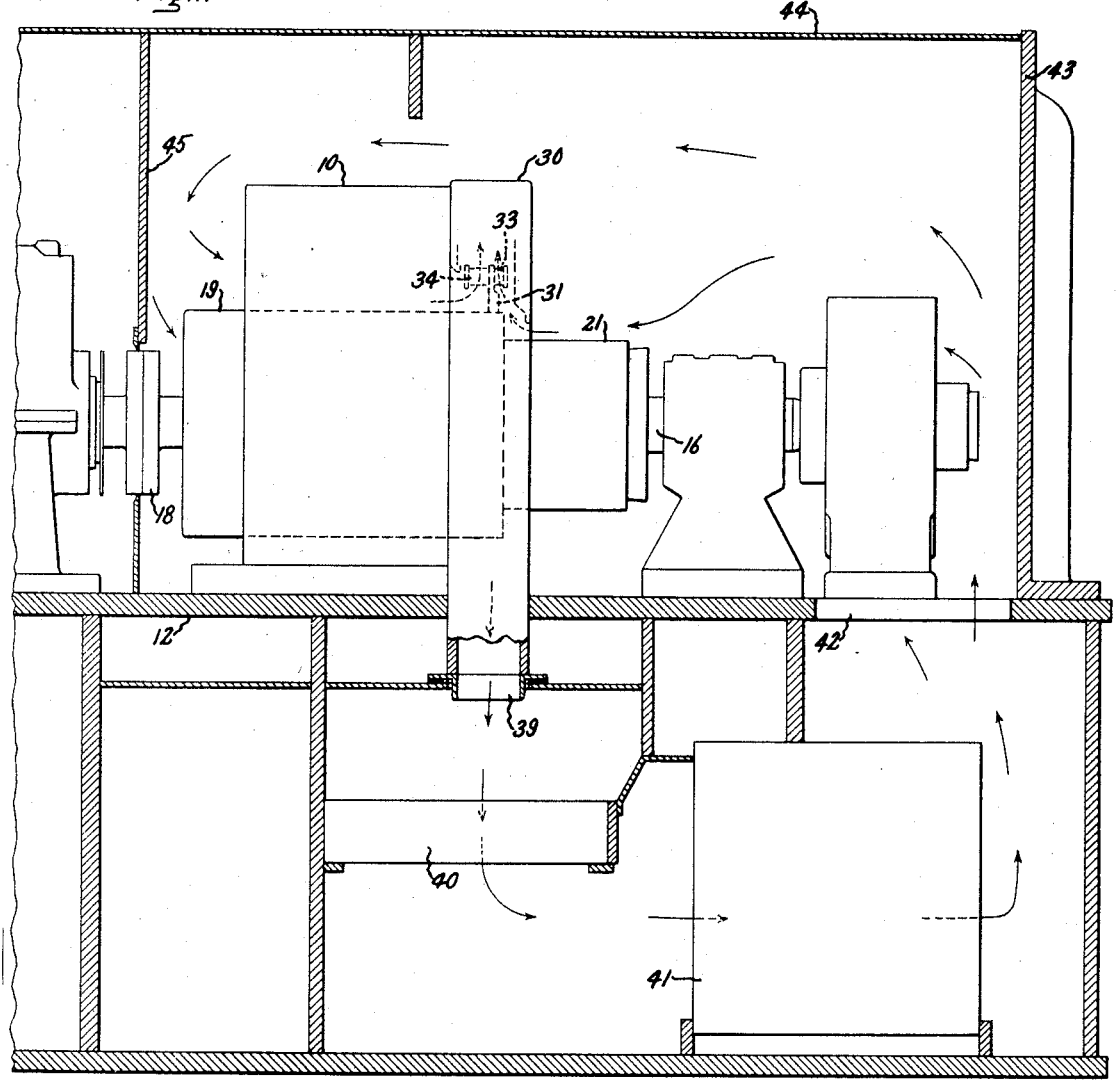
Figure 2:
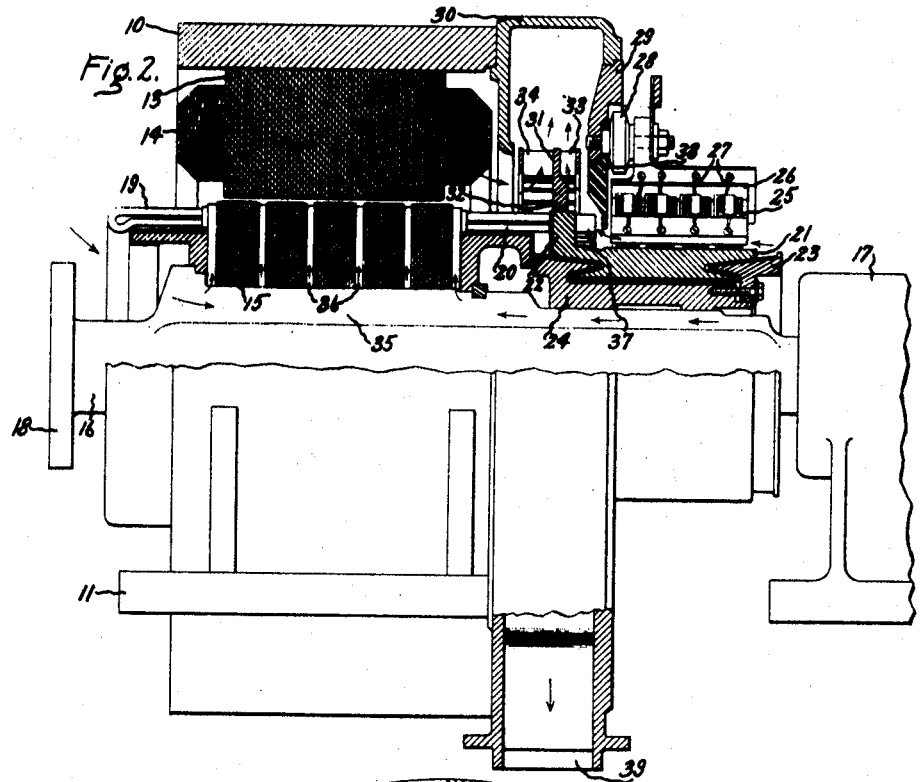
Figure 3:
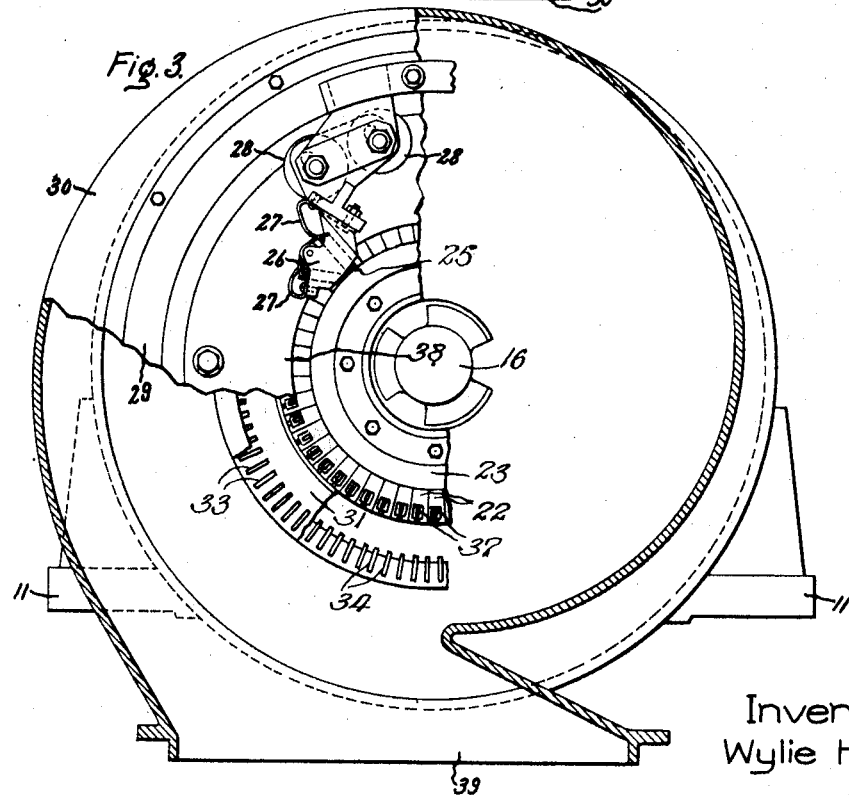

In the drawings, Fig. 1 illustrates a dynamoelectric machine and its associated equipment providing my improved ventilating system; Fig. 2 is a side elevational view, partly in section, of a dynamo-electric machine showing the details of my improved cooling medium impeller and associated features of the machine shown in Fig. 1; and Fig. 3 is an end view, partly broken away, of the machine shown in Fig. 2.

Referring to the drawings, I have shown a dynamo-electric machine of the commutator type which is adapted to be cooled by a substantially closed ventilating system. With this type of equipment, it is often found that the commutator temperatures limit the capacity of the machine so that it is desirable that the flow of ventilating medium should first pass over the commutator before coming in contact with other parts of the machine. Such an arrangement, however, has been found undesirable with commutator machines, particularly if carbon brushes are used, as the wearing of the brushes produces carbon dust which then is drawn into the machine and tends to collect on the machine parts and decrease the efficiency of heat transfer from the other parts of the machine, thus decreasing the efficiency of the ventilating system.

The illustrated dynamo-electric machine is provided with a stationary member including a magnet frame 10 provided with supporting feet 11 adapted to support the machine on a platform structure 12. The excitation of the machine is provided by salient pole pieces secured to the magnet frame 10 and including cores 13 of magnetic material excited by field exciting windings 14. A rotatable member is provided which is adapted to react electrodynamically with the stationary member of the machine and includes an armature provided with a laminated core 15 of magnetic material mounted upon a shaft 16 supported at one end by a pedestal bearing 17 and adapted to be coupled to another shaft at the other end by a coupling flange 18 formed on the shaft 16. The rotatable member is provided with an armature winding 19 arranged in slots formed in the laminated core 15 and connecting leads 20 extend from the winding to a commutator provided with commutator bars 21 having riser elements 22 to which the connecting leads 20 are electrically connected. The commutator bars 21 are secured together by a clamping flange 23 and a mounting ring 24 secured to the shaft. A plurality of carbon brushes 25 is adapted to collect electric current from the commutator and these brushes are arranged in brush holders 26 to which they are electrically connected by leads 27. The brush holders 26 are supported by insulating mountings 28 secured to a mounting plate 29 which forms a closure for a ventilating medium exhaust casing 30 mounted on the stationary magnet frame 10.

In order to ventilate the machine, a double fan including a web 31 is mounted directly upon the commutator risers 22 and secured thereto by a shrink fit about a ring 32 of insulating material. In order to insure against the deposit of carbon from the brushes 25 on the machine elements, the fan is provided with ventilating medium impeller blade elements 33 on the side thereof towards the commutator and other fan blade elements 34 on the side of the web 31 towards the machine windings. The impeller blades 34 are adapted to draw ventilating medium through the machine about the pole pieces 13 and the field exciting windings 14 and over the armature winding 19 and through axially extending passages 35 in the shaft 16 extending therethrough from each end and communicating with radially extending ventilating passages 36 formed in the laminated core 15. This ventilating medium is exhausted by the impeller blades 34 into the exhaust casing 30 without passing over the commutator elements 21 so that only clean air is drawn through the dynamo-electric machine rotatable member and over the stationary member of the machine. In order to cool the commutator, the armature winding leads 20 are arranged to extend through the commutator risers 22 and extend beyond these risers in the form of ventilating medium impeller blades 37 which are adapted to draw air over the commutator. An annular plate 38 of insulating material is secured to the mounting rings 29 and extends to closely adjacent the outer periphery of the commutator near the armature lead projections 37 for directing the ventilating medium flow over the commutator towards these lead projections. This insulating plate also provides an added protection when it is desired to change or examine the brushes 25 while the machine is operating. The ventilating medium flow over the commutator which is created by the armature lead projection 37 is assisted by the impeller blades 33 which exhaust this ventilating medium into the exhaust casing 30, thereby insuring a separate flow of ventilating medium over the commutator and through the stationary and rotatable members of the machine. All of the ventilating medium which cools the dynamo-electric machine is exhausted through the casing 30 at the lower end 39 thereof, and, as shown in Fig. 1, passes through an air filter 40 of any suitable type from which it is conducted through a ventilating medium cooler 41 and returned through an opening 42 in the supporting platform structure 12 to the enclosing casing formed by walls 43, 44, and 45 about the dynamo-electric machine. The flow of the cooling medium is indicated by arrows in Figs. 1 and 2 to illustrate more clearly how the cleaned and cooled ventilating medium is adapted to flow through the machine without drawing into the machine any of the carbon brush dust.

While I have illustrated and described a particular embodiment of my invention, modifications thereof will occure to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamo-electric machine having a stationary member and a rotatable member provided with a winding and a commutator having risers for connecting said winding thereto, a double fan mounted on said commutator risers, means for insulating said fan from said risers, and means including said fan having ventilating medium propelling elements on the side thereof towards said commutator and on the side thereof towards said winding for drawing a separate flow of ventilating medium through said stationary and rotatable members and over said commutator.

2. A dynamo-electric machine having a stationary member and a rotatable member provided with a winding and a commutator having risers for connecting said winding thereto, said winding having connecting leads electrically connected to said commutator risers and projecting therethrough towards said commutator forming impeller blades extending over said commutator adapted to circulate ventilating medium over said commutator, and means including an insulating plate arranged to extend to closely adjacent the outer periphery of said commutator for directing the ventilating medium flow over the commutator towards said lead projections.

3. A dynamo-electric machine having a stationary member and a rotatable member provided with a winding and a commutator having risers for connecting said winding thereto, a ventilating medium exhaust casing, a double fan mounted on said commutator risers, means for insulating said fan from said risers, means including said fan having ventilating medium propelling elements on the side thereof towards said commutator and on the side thereof towards said winding for drawing a separate flow of ventilating medium through said stationary and rotatable members and over said commutator and exhausting the ventilating medium into said exhaust casing, and means communicating with said exhaust casing for cooling and cleaning the ventilating medium.

4. A dynamo-electric machine having a stationary member and a rotatable member provided with a winding and a commutator having risers for connecting said winding thereto, said winding having connecting leads electrically connected to said commutator risers and projecting therethrough towards said commutator forming impeller blades adapted to circulate ventilating medium over said commutator, a double fan mounted on said commutator risers, means for insulating said fan from said risers, means including said double fan for drawing a separate flow of ventilating medium through said stationary and rotatable members and over said commutator.

5. A dynamo-electric machine having a stationary member and a rotatable member provided with a winding and a commutator having risers for connecting said winding thereto, said winding having connecting leads electrically connected to said commutator risers and projecting therethrough towards said commutator forming impeller blades adapted to circulate ventilating medium over said commutator, a ventilating medium exhaust casing, a double fan mounted on said commutator risers, means for insulating said fan from said risers, means including said double fan for drawing a separate flow of ventilating medium through said stationary and rotatable members and over said commutator and exhausting the ventilating medium into said exhaust casing, means communicating with said exhaust casing for cooling and cleaning the ventilating medium, and means for conducting the cooled and cleaned ventilating medium to said dynamo-electric machine.

6. A dynamo-electric machine having a stationary member and a rotatable member provided with a winding and a commutator having risers for connecting said winding thereto, said winding having connecting leads electrically connected to said commutator risers and projecting therethrough towards said commutator forming impeller blades adapted to circulate ventilating medium over said commutator, means including an insulating plate arranged to extend to closely adjacent the outer periphery of said commutator for directing the ventilating medium flow over the commutator towards said lead projections, means including a double fan mounted on said commutator risers and provided with ventilating medium propelling elements on the side thereof towards said commutator and on the side thereof towards said winding for cooperating with said projecting lead impeller blades in drawing a separate flow of said medium over said commutator and through said stationary and rotatable members, and means for insulating said fan from said risers.

7. A dynamo-electric machine having a stationary member and a rotatable member provided with a winding and a commutator having risers for connecting said winding thereto, said winding having connecting leads electrically connected to said commutator risers and projecting therethrough towards said commutator forming impeller blades adapted to circulate ventilating medium over said commutator, means including an insulating plate arranged to extend to closely adjacent the outer periphery of said commutator for directing the ventilating medium flow over the commutator towards said lead projections, a ventilating medium exhaust casing, a double fan mounted on said commutator risers, means for insulating said fan from said risers, means including said fan having ventilating medium propelling elements on the side thereof towards said commutator and on the side thereof towards said winding for drawing a separate flow of said medium through said stationary and rotatable members and over said commutator and exhausting the ventilating medium into an exhaust casing, means communicating with said exhaust casing for cooling the ventilating medium, means for cleaning the ventilating medium, and means for conducting the cooled and cleaned ventilating medium to said dynamo-electric machine.

8. A ventilating medium impeller for a dynamo-electric machine provided with a commutator comprising connecting leads from the dynamo-electric machine rotatable member winding having portions extending through riser elements of said commutator and from the other side over said commutator, said extending portions forming impeller blades adapted to circulate ventilating medium over said commutator.

WYLIE HETER.